(12) United States Patent
Naganathan et al.

(10) Patent No.: US 10,951,547 B2
(45) Date of Patent: Mar. 16, 2021

(54) MESSAGE SEQUENCE EVALUATION FOR REDUNDANT COMMUNICATION SYSTEM

(71) Applicant: STEERING SOLUTIONS IP HOLDING CORPORATION, Saginaw, MI (US)

(72) Inventors: Vinod Shankar Naganathan, Saginaw, MI (US); Akilan Rathakrishnan, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 228 days.

(21) Appl. No.: 16/003,672

(22) Filed: Jun. 8, 2018

(65) Prior Publication Data

US 2018/0359196 A1 Dec. 13, 2018

Related U.S. Application Data

(60) Provisional application No. 62/517,482, filed on Jun. 9, 2017.

(51) Int. Cl.
*H04L 12/939* (2013.01)
*H04L 1/22* (2006.01)
*H04L 1/08* (2006.01)
*H04L 12/40* (2006.01)

(52) U.S. Cl.
CPC .............. *H04L 49/552* (2013.01); *H04L 1/08* (2013.01); *H04L 1/22* (2013.01); *H04L 12/40182* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

2016/0381068 A1\* 12/2016 Galula ................ B60R 16/0231
726/23
2019/0179310 A1\* 6/2019 Sakamoto ........... B60W 50/087
2019/0207950 A1\* 7/2019 Mohammed ............ H04L 67/12

\* cited by examiner

*Primary Examiner* — Chat C Do
*Assistant Examiner* — William C Wood
(74) *Attorney, Agent, or Firm* — Dickinson Wright PLLC (57) ABSTRACT

The technical solutions described herein address technical challenges in case of redundant communication channels between microcontrollers (MCU)s, which communicate the same information and use rolling counter(s). For example, the technical solutions include a method to evaluate a sequence of communication messages between the MCUs in a redundant communication network and react responsively.

20 Claims, 8 Drawing Sheets

MESSAGE SEQUENCE EVALUATION FOR REDUNDANT COMMUNICATION SYSTEM

CROSS-REFERENCES TO RELATED APPLICATIONS

This patent application claims priority to U.S. Provisional Patent Application Ser. No. 62/517,482, filed Jun. 9, 2017, which is incorporated herein by reference in its entirety.

BACKGROUND

A vehicle can include one or more electronic control units (ECUs) that communicate with each other. The communication can include transfer of data, commands, and the like between one or more ECUs associated with an electric power steering (EPS) system in the vehicle and other ECUs in the vehicle.

Increasing reliance on advanced driver assistance systems (ADAS) has resulted in one or more controllers of various subsystems in a vehicle to communicate with each other even more, and making such communication more critical for operation of the vehicle. For example, the communication facilitates the subsystems to share information, in turn facilitating a subsystem to react to actions being taken by other subsystems automatically.

In addition, increasing vehicle safety requirements are driving system redundancy to achieve higher safety levels. Redundancy is achieved by proliferation of the control system of the vehicle, to the extent of having redundant ECUs. This in turn demands a robust and failsafe communication method between the two ECUs. A poor communication link between ECUs has an adverse effect on the overall system performance, leading to a safety hazard.

Operator and passenger safety is of prime importance in case of vehicles. To increase safety levels, vehicles are equipped with redundant systems. For example, redundancy is achieved by proliferation of a control system, and in some cases to the extent of having redundant microcontrollers. A system with redundant microcontrollers introduces multiple complexities in various operations, including communication strategy between the redundant microcontrollers.

Accordingly, it is desirable to facilitate redundant microcontrollers to communicate without causing any errors.

SUMMARY

The technical solutions described herein address technical challenges in case of redundant communication channels between microcontrollers (MCUs). For example, the technical solutions facilitate evaluating a sequence of communication messages between the MCUs in a redundant communication network and react responsively.

According to one or more embodiments, a computer-implemented method for evaluating a network communication received over redundant communication channels includes receiving, by a first controller, a first communication message transmitted by a second controller, and receiving, by the first controller, a second communication message transmitted by the second controller. The method further includes evaluating, by the first controller, a rolling counter of the second communication message to determine validity of the data in the second communication message based on a present rolling counter value being within a first predetermined range if the first communication message and the second communication message are both received via a first communication channel, and the present rolling counter value being within a second predetermined range if the first communication message and the second communication message are received via a first communication channel and a second communication channel respectively. The method further includes in response to the data being valid based on the evaluation, using, by the first controller, the data from the second communication message.

According to one or more embodiments, a communication system includes a first controller, a second controller, and one or more redundant communication channels that couple the first controller and the second controller. The first controller transmits data to the second controller via the one or more communication channels in a redundant manner, and the second controller evaluates validity of the data received over the one or more redundant communication channels from the first controller. The evaluation of the validity of the data is based on a present rolling counter value being within a first predetermined range if the data and a previous data are both received via a first communication channel, and the present rolling counter value being within a second predetermined range if the data and the previous data are received via the first communication channel and a second communication channel respectively. The second controller uses the data in response to the data being valid based on the evaluation.

According to one or more embodiments, a computer program product includes non-transitory computer readable medium with computer executable instructions stored therein. The computer executable instructions when executed by a first controller cause the first controller to communicate with a second controller, the communicating including receiving a first communication message transmitted by the second controller, and receiving a second communication message transmitted by the second controller. The first controller further evaluates a rolling counter of the second communication message to determine validity of the data in the second communication message based on a present rolling counter value being within a first predetermined range if the first communication message and the second communication message are both received via a first communication channel, and the present rolling counter value being within a second predetermined range if the first communication message and the second communication message are received via a first communication channel and a second communication channel respectively. In response to the data being valid based on the evaluation, the first controller uses the data from the second controller.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
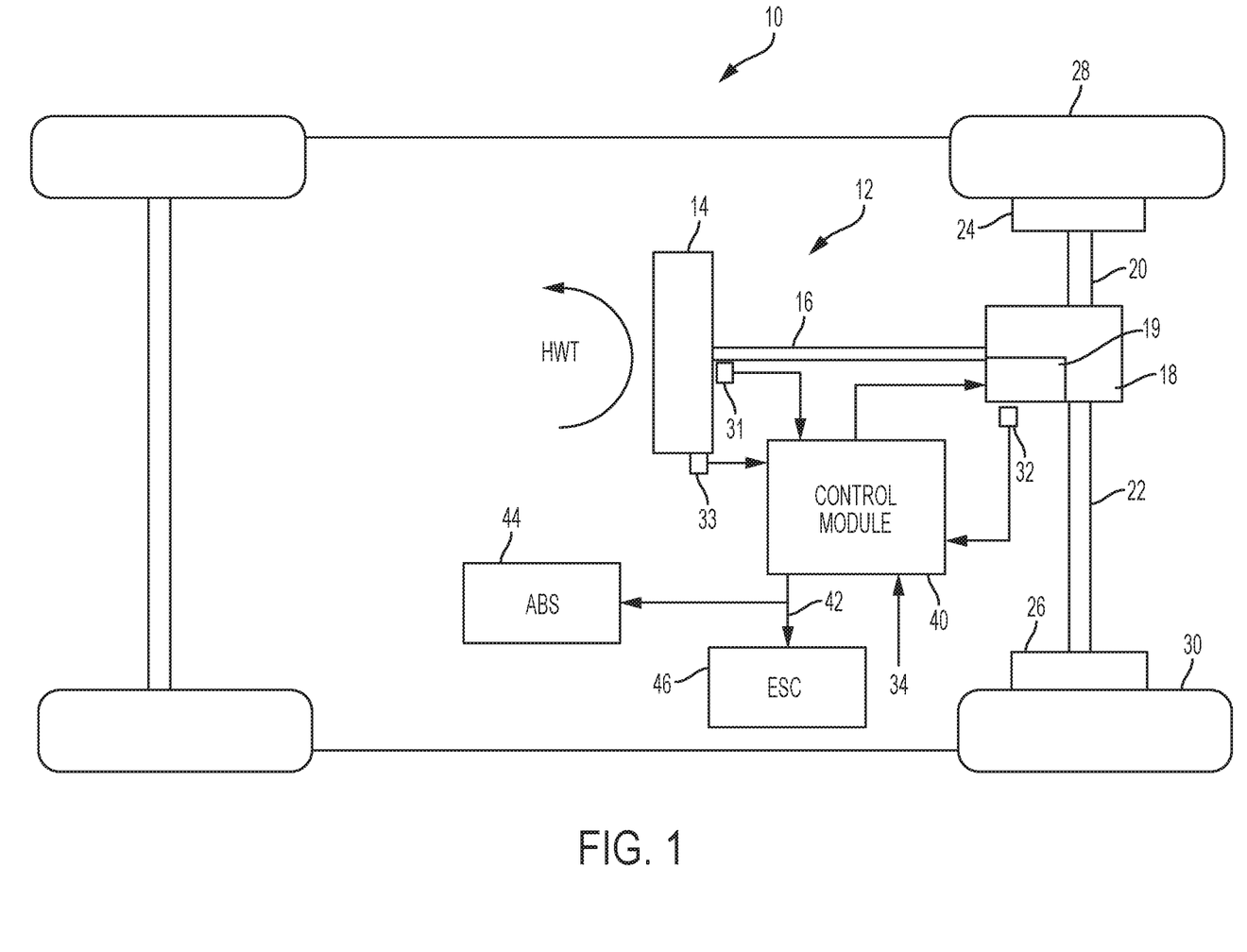
FIG. 1 illustrates a vehicle including a steering system, according to one or more embodiments.

Referring now to the Figures, where the invention will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein.

Communication with the ABS 44, ESC system 46, and other systems (not depicted), can be performed using, for example, a controller area network (CAN) bus or other vehicle network known in the art to exchange signals such as the vehicle speed signal 34. In one or more examples, hardware limitations and diversification of communication channels drive the inter-micro communication links to use different protocols, for example CAN, Serial Communications Interface (SCI), Multi-Processor Link Interface (MLI), among others. Each protocol may satisfy a portion of the safety aspects of data handling, but does not inherently ensure all safety aspects are covered.

The control module 40 may be an ECU. The vehicle 10 includes additional ECUs. The control module 40 receives information from the other ECUs, such as the vehicle speed signal 34, the sensor information, and various other information. As described earlier, there are multiple communication methods designed for inter-micro communication, such as the protocols SCI, CAN, and MLI, among others. The components that facilitate communication between two (or more) ECUs in the vehicle 10, or between two (or more) microcontrollers within the control module 40) are together referred to as a communication system herein.

In a communication system, two microcontrollers (MCUs) can be connected for communication using multiple architectures. The architecture used determines a methodology in which the two MCUs are connected to a communication bus that transports communication messages between the two MCUs. The technical solutions described herein addresses technical challenges for a communication system that has a redundant communication channel between the MCUs which communicates the same information as the information transported by the communication messages on the communication bus. For any communication message transported between the two MCUs, the validity of the information received is vital. In certain cases, the validity is also tied to the sequence in which the messages are received for example, a recipient MCU 120 may have to identify conditions such as a missed message, a stale message, an out of sequence message, among others.

Typically, a rolling counter is used for this purpose, and the sequence of the rolling numbering is evaluated to assess the nature of the message. A rolling counter is a running number that is appended along with the message payload. Typically, the running number is evaluated on message reception and verified for consecutiveness. The technical solutions described herein includes an algorithm to evaluate a sequence of the transported messages and react responsively in a redundant communication system.

Figure 2:
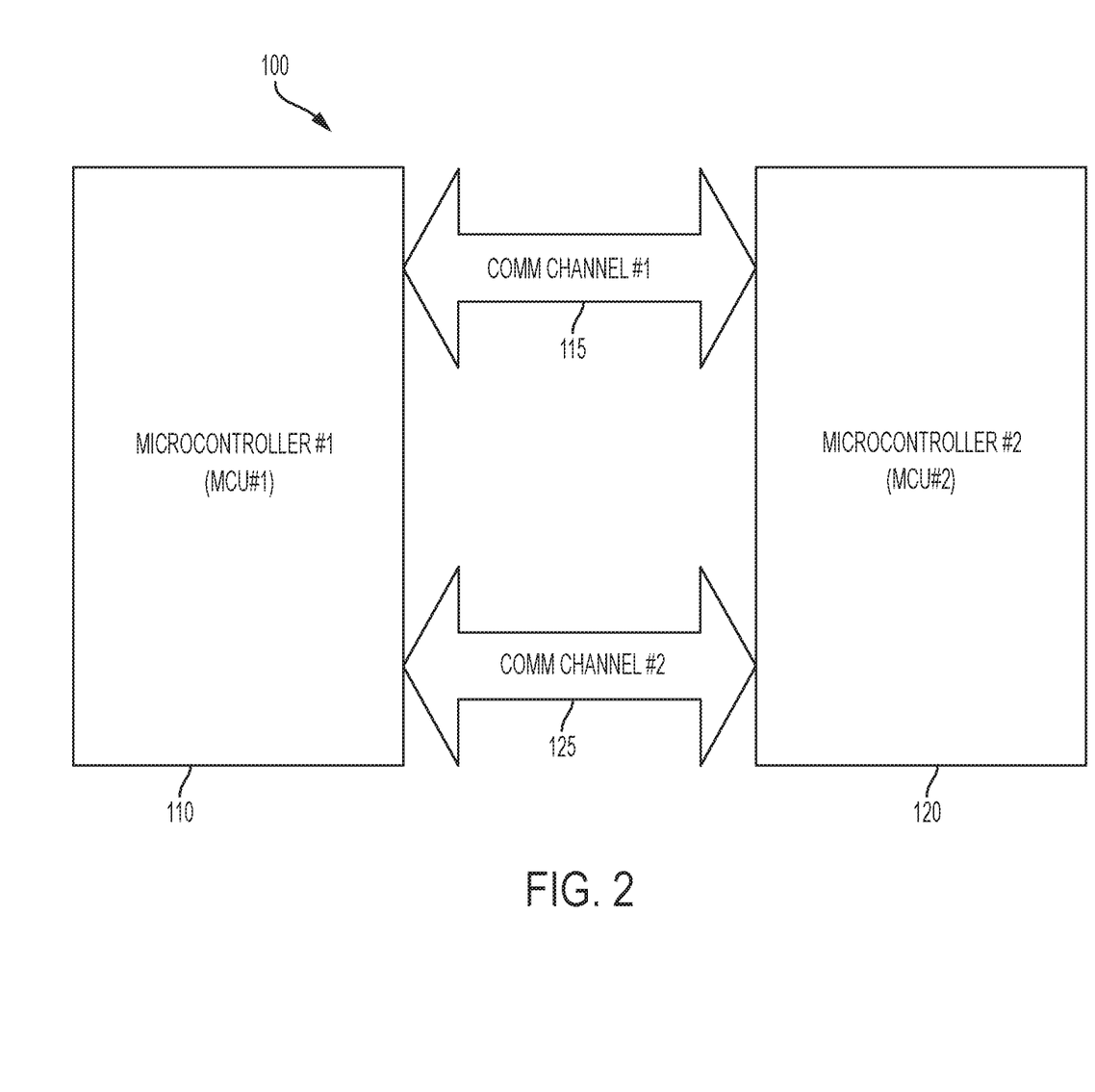
FIG. 2 illustrates a redundant communication system according to one or more embodiments.

FIG. 2 depicts an example redundant communication system according to one or more embodiments. The communication system 100 is a 'redundant' communication system because it includes at least two MCUs 110 and 120 communicating with each other in a redundant manner with two communication channels 115 and 125, each communication channel sending the same data. The data is transmitted in form of a communication message via the communication channels 115 and 125. The two communication channels 115 and 125 between the MCUs 110 and 120 may use the same or different communication protocols. For each communication, data is read from each of the communication channels 115 and 125 and valid data among the two received data is used for further processing by the recipient MCU 110 or 120. Validity of data is determined using algorithms like cyclic redundancy check (CRC), rolling counters, etc. Such a communication system 100 can be used in an autonomous or semi-autonomous vehicle or with a steering system used to control such vehicle, or in various other applications. In the one or more examples described herein the MCU 110 is considered as the MCU that sends data, i.e. a source MCU 110; whereas the MCU 120 is considered as the MCU that receives the data i.e. a recipient MCU 120. However, it is understood that the roles may be reversed in other examples.

Because of the redundant communication channels 115 and 125, the communication system 100 faces technical challenges that include different protocols having different data handling methods that can cause, at an instant, the data received from the two redundant communication channels 115 and 125 being different. Further, the technical challenges includes the different handling of the different protocols impacting the functionality scheduling of the recipient MCU 120, which further causes the recipient MCU 120, at an instant, to process different data. Further yet, the technical challenges include that a reset of one of the MCUs 110 and 120 causes loss in synchronization in the communication system 100. Further, a corruption/error in a channel level causes loss in messages and hence loss in synchronization between the MCUs 110 and 120. The technical solutions described herein address such technical challenges and determine a robust approach to handle the communication between the two MCUs using the redundant channels. The technical solutions described herein thus address technical challenges rooted in computer technology, particularly in a redundant communication system. The technical solutions described herein further improve the computer rooted technology, particularly a redundant communication system by improving synchronization of communication in the redundant communications across multiple channels which use different communication protocols.

In one or more examples, the technical solutions use two periodic operations to facilitate evaluating the message sequence between the two MCUs 110 and 120. A first periodic operation is a data reception, which is executed at the rate of message reception. In one or more examples, a data reception module executes the data reception operation. The data reception evaluates the validity of the message received from both the communication channels 115 and 125 and evaluates if a good data is available from any of the channels 115 and 125. The data reception further process valid data from one of the channels 115 and 125.

A second periodic operation is a reset detection, which is executed at a slower rate—lower than a typical time taken by the communication system 100 to reset and come back alive on the network. In one or more examples, a reset detection module executes the reset detection at the predetermined rate. The reset detection assists in immediate re-synchronization on a reset scenario.

The technical solutions described herein further facilitate validation of the data sequence of message from the two communication channels 115 and 125 using a rolling counter check based approach. The technical solutions described herein facilitate identification of the communication channel 115 or 125 from which data is used for further processing. The technical solutions described herein facilitate data sequence validation from communication channels 115 or 125, which have same or different characteristics. The technical solutions described herein facilitate an MCU 110 (or 120) to detect a reset of the other MCU 120 (or 110), and resynchronize the rolling counter check. The technical solutions described herein facilitate resynchronization of the rolling counter check during data corruption in the channels 115 or 125. The technical solutions described herein further facilitate resynchronization of the rolling counter check when a rolling counter reference changes. The technical solutions described herein facilitate indicating if a rolling counter fault is to be reported. The technical solutions described herein thus address technical challenges rooted in computer technology, particularly in a redundant communication system using a rolling counter based synchronization check. The technical solutions described herein further improve the computer rooted technology, particularly a redundant communication system that uses a rolling counter check by improving synchronization of communication in the redundant communications across multiple channels and further synchronizing the rolling counter based check in case of a failure/reset at one of the MCUs in the redundant communication system.

FIGS. 3-8 depict flowcharts of example methods for evaluating a communication between two MCUs using redundant communication channels according to one or more embodiments. The flowcharts depict methods that are executed by a recipient MCU 120 in the communication system 100. In the examples described herein, DataValid is a flag, which indicates if valid data is received from a communication channel 115 and 125. Further, ValidDataSource indicates which communication channel among the two redundant communication channels 115 and 125 has valid data, such as based on a CRC check or a rolling counter check. Further, MessageSkipCounter is a counter which indicates the number of missed messages in the form of 'No data' or invalid data. Additionally, McuResetCounter is a counter that indicates the number of times no data is received from the communication channel 115 or 125. This is an indication of a reset of the other MCU 110 (or 120). Further yet, RollCounterResyncCounter is a counter, which indicates the number of times data is missed because of only rolling counter issue. ResyncThreshold is the number of consecutive rolling counter issues after which it could be assumed that either of the MCUs 110 and 120 have lost synchronization of rolling counter, and hence a resynchronization (resync) has to happen.

Further, as used in the examples herein, a RollCounterError flag indicates if a rolling counter fault is to be reported to an operator. A ResetStatus flag indicates if a reset has occurred in the other MCU 110 (or 120). The recipient MCU 120 further uses a CounterThreshold, which is a value related to the typical amount of latency in data transmission in the communication channel 115 or 125. Further, ChannelSwitchDelay provides a value related to the dynamics of the redundant communication channels 115 and 125. This indicates the typical delay in a message reception between the communication channels 115 and 125 at any instant. Additionally, a PreviousRollingCounter is maintained, which is the value of the rolling counter of the previously stored valid message.

Figure 3:
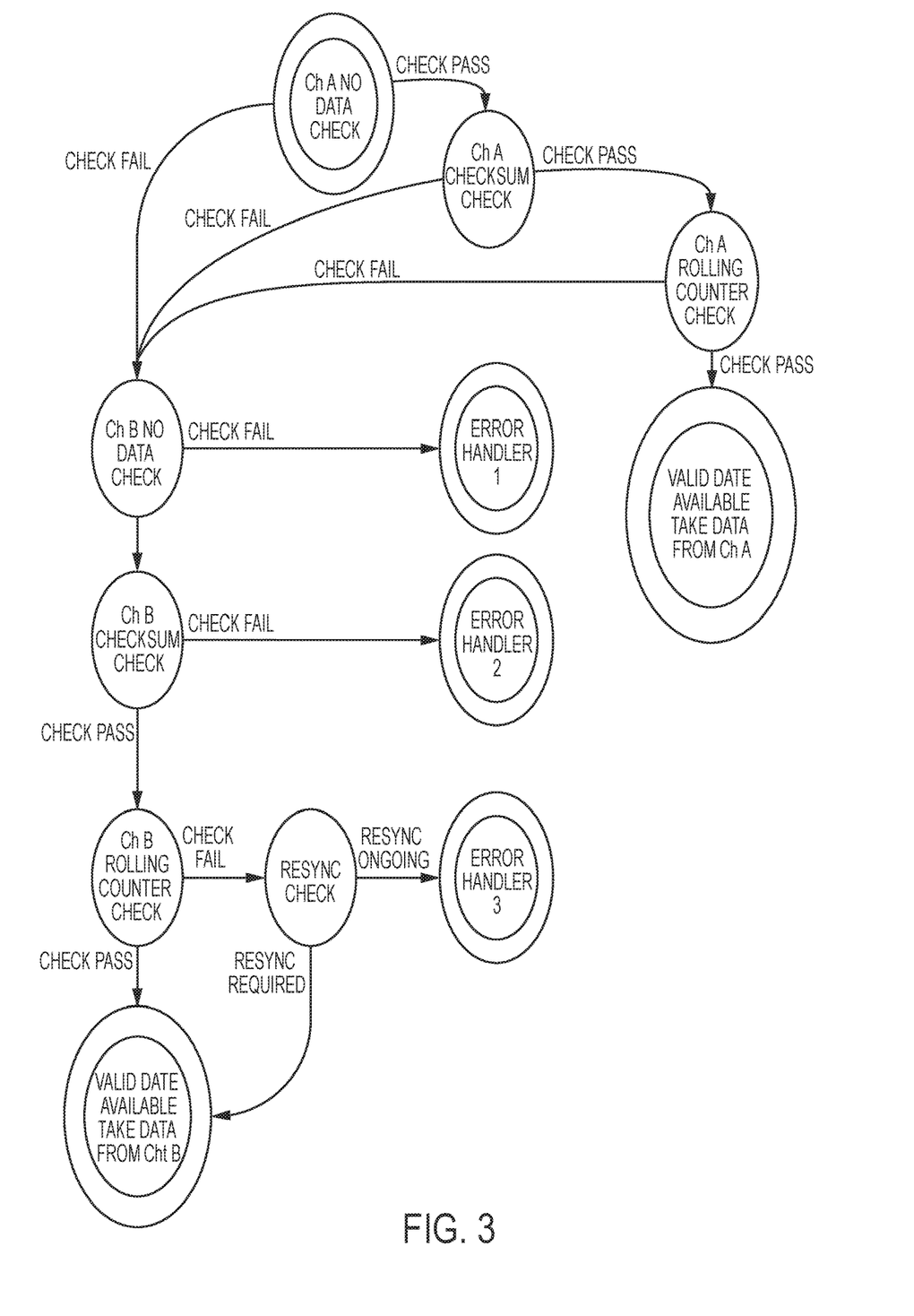
FIG. 3 depicts a flowchart for performing an error check in a redundant communication system according to one or more embodiments.

FIG. 3 depicts a flowchart for performing an error check in a redundant communication system according to one or more embodiments. The recipient MCU 120 determines if there is an error after performing one or more data checks on data received via both communication channels 115 and 125. As depicted, the recipient MCU 120 checks if there is no data received from the first communication channel 115, at 305. If data is received, the recipient MCU 120 checks the validity of the data using an algorithm such as a CRC, at 310. If the CRC check passes, the recipient MCU 120 performs another check such as the rolling counter check, at 315. If the rolling counter check also passes, the recipient MCU 120 uses the data from the first communication channel 115, at 320.

In case any of the checks (305, 310, 315) performed fail, the recipient MCU 120 checks if the data from the second communication channel 125 can be used. The recipient MCU 120 checks if there is data received from the second communication channel at 325. If data is received, the recipient MCU 120 performs a validity check, such as a CRC check, on the data received via the second communication channel 125, at 330. If the validity check passes, the recipient MCU 120 further performs a rolling counter check on the data from the second communication channel 125, at 335. If the rolling counter check also passes, the recipient MCU 120 uses the data from the second communication channel 125, at 340.

In the case the data checks of the second communication channel 125 also fail, the recipient MCU 120 performs one or more error handling depending on which data check fails. If there is no data received via the second communication channel 125, at 325, the recipient MCU performs a first error handling, at 345. The first error handling includes updating the MessageSkipCounter, the McuResetCounter, the RollCounterResyncCounter, the DataValid flag, and the RollCounterError flag. The updates are as depicted in Table 1.

TABLE 1

MessageSkipCounter ++
McuResetCounter ++
RollCounterResyncCounter = 0
DataValid = False
RollCounterError = False If the data validity check of the data received via the second communication channel 125 fails, at 330, the recipient MCU 120 performs a second error handling, at 350. The second error handling includes updating the MessageSkipCOunter, the McuResetCounter, the RollCounterResyncCounter, the DataValid flag, and the RollCounterError flag. The updates are as depicted in Table 2.

TABLE 2

MessageSkipCounter ++
McuResetCounter = 0
RollCounterResyncCounter = 0
DataValid = False
RollCounterError = False If the rolling counter check of the data received via the second communication channel 125 fails, at 335, the recipient MCU 120 performs a rolling counter resynchronization check, at 355. If resynchronization is required, the recipient MCU 120 performs the resynchronization and uses the data received via the second communication channel 125, at 340. Else, if resynchronization is ongoing, the recipient MCU 120 performs a third error handling, at 360. The third error handling includes updating the MessageSkipCOunter, the McuResetCounter, the RollCounterResyncCounter, the DataValid flag, and the RollCounterError flag. The updates are as depicted in Table 3.

TABLE 3

MessageSkipCounter ++
McuResetCounter = 0
RollCounterResyncCounter ++
DataValid = False
RollCounterError = True If the data is found valid and is used by the recipient MCU 120, at 320 and 340, either from the first communication channel 115 or the second communication channel 125, the recipient MCU 120 updates the MessageSkipCOunter, the McuResetCounter, the RollCounterResyncCounter, the DataValid flag, and the RollCounterError flag. The updates are depicted in Table 4.

TABLE 4

Figure 4:
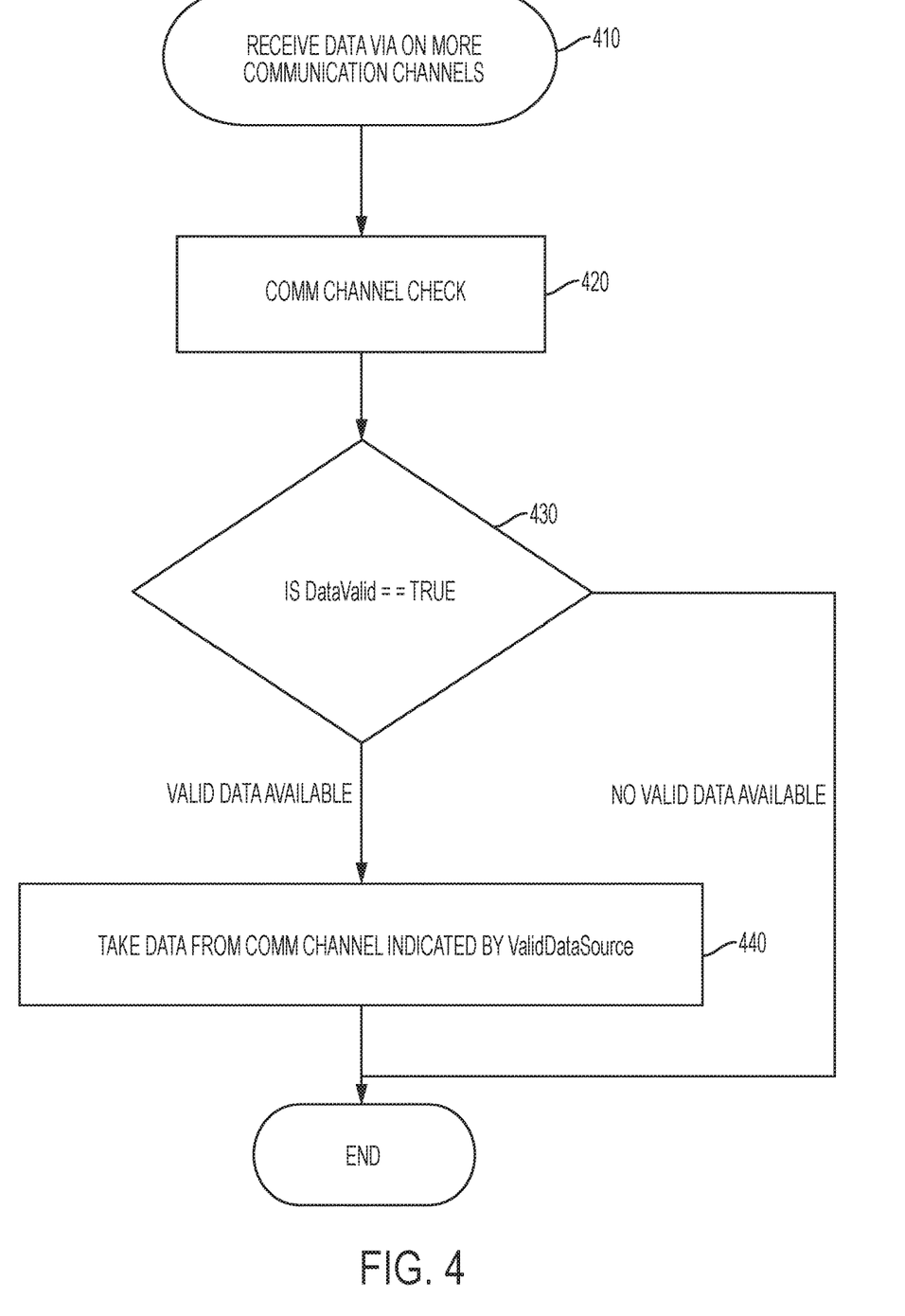
FIG. 4 depicts a flowchart for an example method for data reception by a recipient MCU of a redundant communication system according to one or more embodiments.

MessageSkipCounter = 0
McuResetCounter = 0
RollCounterResyncCounter = 0
DataValid = True
RollCounterError = False FIG. 4 depicts a flowchart for an example method for data reception by a recipient MCU of a redundant communication system according to one or more embodiments. The method includes the recipient MCU 120 receiving data, at one or both communication channels 115 and 125, at 410. The method further includes performing data checks on the data received, at 420. The data checks are performed on the first communication channel 115 and the second communication channel 125, if required, as described herein (FIG. 3). If the data received from either or both the communication channels 115 and 125 is valid, the DataValid flag is set to TRUE. Accordingly, if the flag is TRUE, the recipient MCU 120 uses the data from whichever communication channel 115 or 125 is indicated to have valid data, at 430 and 440. If data received from neither of the communication channels 115 and 125 is valid, the recipient MCU 120 proceeds to error status updating and reporting as required and as described further.

Figure 5:
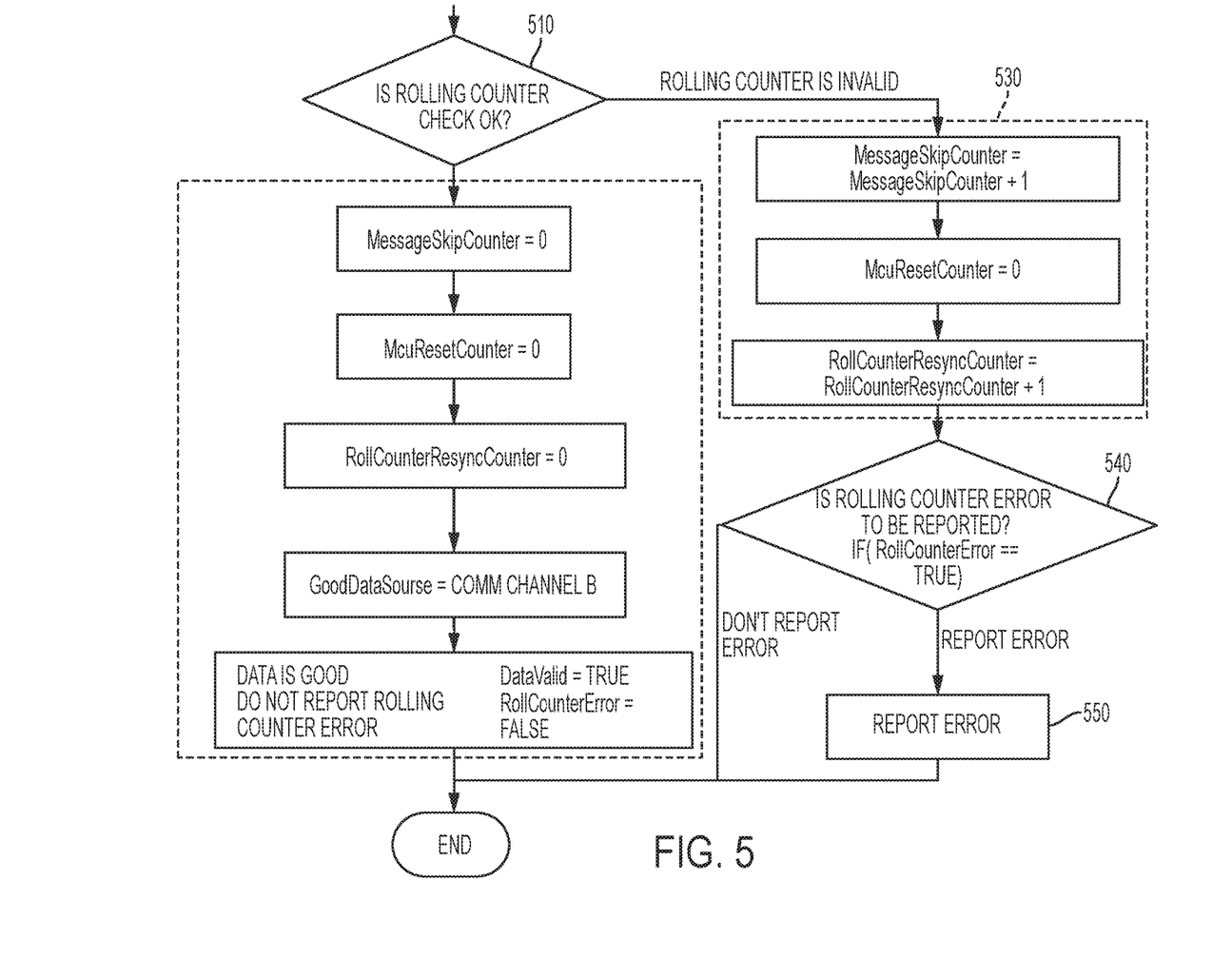
FIG. 5 depicts a flowchart for an example method for rolling counter check response according to one or more embodiments.

FIG. 5 depicts a flowchart for an example method for rolling counter check response according to one or more embodiments. If the rolling counter check passes, the recipient MCU 120 updates the MessageSkipCounter, the McuResetCounter, the RollCounterResyncCounter, the DataValid flag, and the RollCounterError flag, at 510 and 520. The updates are depicted in Table 4. Further, the recipient MCU 120 indicates that the data source being used is the second communication channel 125 (or 115), at 522. If the rolling counter check does not pass, the recipient MCU 120 updates the MessageSkipCounter, the McuResetCounter, and the RollCounterResyncCounter, at 530. The recipient MCU 120 further determines if the rolling counter error is to be reported based on the status of the RollCounterError flag, and reports the rolling counter error to an operator, at 540 and 550. If the rolling counter error is not reported based on the status of the RollCounterError flag, at 540. In this case, the DataValid flag value is not changed.

Figure 6:
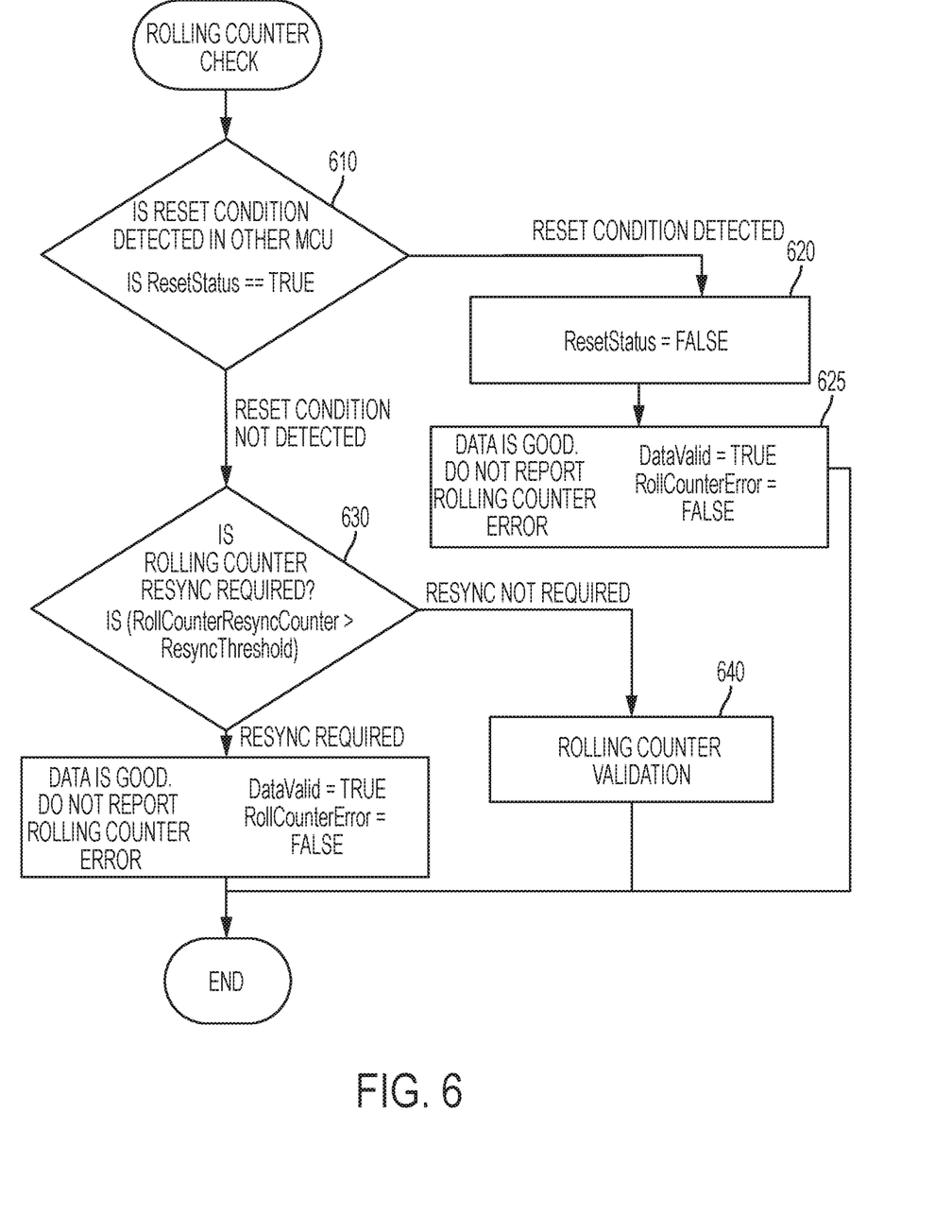
FIG. 6 depicts a flowchart for an example method to perform a rolling counter check according to one or more embodiments.

FIG. 6 depicts a flowchart for an example method to perform a rolling counter check according to one or more embodiments. The method includes checking, by the recipient MCU 120, if the source MCU 110 has the Reset flag set to TRUE, at 610. If the source MCU 110 has the Reset flag set, the recipient MCU 120 sets its own Reset flag to FALSE, at 620. The recipient MCU 120 further uses the received data as valid data by setting DataValid flag to TRUE, at 625. Further, the recipient MCU 120 sets the RollCounterError flag to FALSE so that a roller counter related error is not reported to the operator, at 625.

Alternatively, if the source MCU 110 does not have the Reset flag set, the recipient MCU 120 determines if a rolling counter resynchronization to be performed, at 630. The check for resynchronization is performed by checking if the RollCounterResyncCounter has exceeded a predetermined ResynchThreshold value. If resynchronization performance is deemed to be required, the recipient MCU 120 determines that the data that is received is valid and sets the DataValid flag to TRUE, at 635. Further, the recipient MCU 120 sets the RollCounterError flag to FALSE so that a roller counter related error is not reported to the operator, at 635.

Instead, if the recipient MCU 120 determines that a roller counter resynchronization is not required, the recipient MCU 120 validates the roller counter value to determine if a roller counter error has occurred, at 640.

Figure 7:
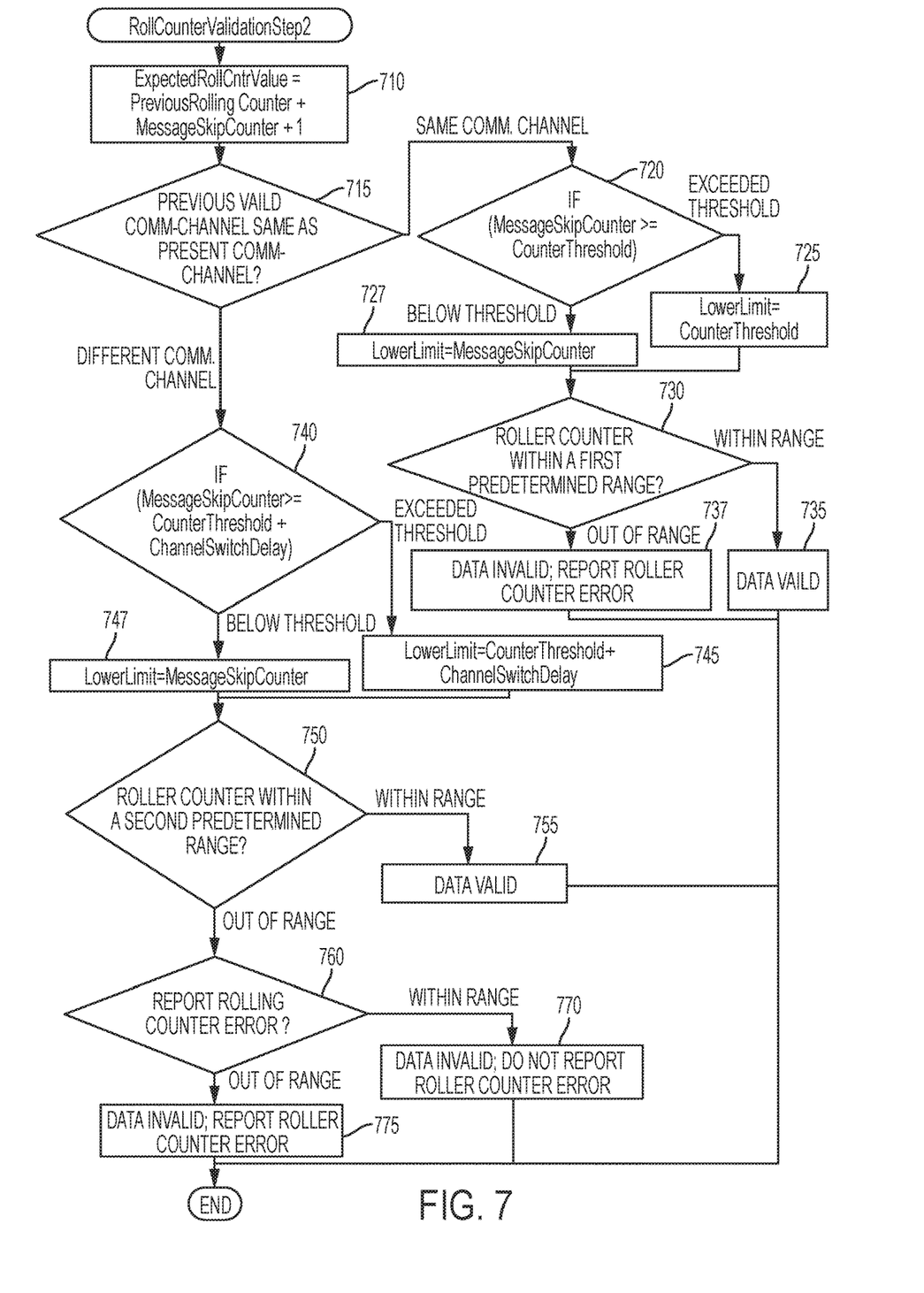
FIG. 7 depicts a flowchart for an example method for performing a roller counter validation according to one or more embodiments.

FIG. 7 depicts a flowchart for an example method for performing a roller counter validation according to one or more embodiments. The validation is performed as described herein during a roller counter check (block 640 in FIG. 6). The validation is performed based on computing an expected roller counter value based on the present roller counter value (PreviousRollinggCounter) and the message skip counter, at 710. The computation is performed as:

ExpectedRollCntrValue=PreviousRollingCounter+MessageSkipCounter+1. The method further includes determining if the previous valid data was received via the same communication channel as the present data, at 715. For example, if the previous valid data that the recipient MCU 120 used was received via the first communication channel 115 and if the present data that is being tested for validity is also received via the first communication channel 115, the communication channels are the same, else if one of the communication channels above is the second communication channel 125, the recipient MCU 120 uses different check. In other words, here, consecutive messages are from same communication channel if a first message at time t1 is received from the first communication channel 115 (or 125) and a second message at time t2 is also received from the first communication channel 115 (or 125).

If the previous valid communication channel is the same as the present communication channel, the method includes ensuring that the lower limit with the latency does not end up in reading old data, at 720. For example, the recipient MCU 120 checks if MessageSkipCounter≥CounterThreshold. If the threshold is exceeded, the lower limit is updated as LowerLimit=CounterThreshold; else, the lower limit is updated as LowerLimit=MessageSkipCounter, at 725 and 727.

The method further includes determining if the roller counter value is within a predetermined range, at 730. In one or more examples, the data is deemed valid if for consecutive messages from same communication channel 115 (or 125), the new rolling counter falls within the range (ExpectedRollCntrValue−LowerLimit)<=CurrentRollingCounter<=(ExpectedRollCntrValue+CounterThreshold), where ExpectedRollCntrValue=PreviousRollingCounter+MessageSkipCounter+1, LowerLimit=CounterThreshold if CounterThreshold is lesser than MessageSkipCounter else, LowerLimit=MessageSkipCounter, at 735. The CounterThreshold value depends on a typical channel disturbance level and is a calibrate-able, preset value in one or more examples.

The recipient MCU 120 sets the DataValid flag to TRUE and the RollCounterError flag to FALSE if the data is deemed valid.

If the roller counter is not in the predetermined range, the recipient MCU 120 deems that the received data is not valid, at 737. The recipient MCU 120 sets the DataValid flag to FALSE and the RollCounterError flag to TRUE.

Alternatively, in the case of different communication channels (block 715), the method includes ensuring that the lower limit with the latency does not end up in reading old data, at 740. For example, the recipient MCU 120 checks if MessageSkipCounter≥(CounterThreshold+ChannelSwitchDelay). If the threshold is exceeded, the lower limit is updated as LowerLimit=CounterThreshold+ChannelSwitchDelay; else, the lower limit is updated as LowerLimit=MessageSkipCounter, at 745 and 747. Here, consecutive messages from different communication channels indicates that a first message at time t1 is received from the first communication channel 115 (or 125) and a second message at time t2 is received from the second communication channel 125 (or 115).

The received data is deemed valid if for consecutive messages from the different communication channels 115 and 125, the new rolling counter falls within a second predetermined range, at 750. The predetermined range used in the same communication channel case is a different range from the second predetermined range that is used in the different communication channel case. The second predetermined range is specified by (ExpectedRollCntrValue−LowerLimit)<=CurrentRolling Counter<=(ExpectedRollCntrValue+(CounterThreshold+ChannelSwitchDelay)), where ExpectedRollCntrValue=PreviousRolling Counter+MessageSkipCounter+1, LowerLimit=CounterThreshold+ChannelSwitchDelay if CounterThreshold is lesser than MessageSkipCounter else, LowerLimit=MessageSkipCounter. The CounterThreshold value depends on a typical channel disturbance level and is a calibrate-able, preset value in one or more examples. The ChannelSwitchDelay value depends on the dynamics of the two communication channels 115 and 125 and is a calibrate-able, preset value in one or more examples.

If the present rolling counter value meets the second predetermined range, the data is deemed valid, at 755. The recipient MCU 120 sets the DataValid flag to TRUE and the RollCounterError flag to FALSE if the data is deemed valid.

If the roller counter is not in the second predetermined range, the recipient MCU 120 checks whether to report a roller counter error, at 760. The determination is made based on a comparison specified by: (ExpectedRollCntrValue−(CounterThreshold+ChannelSwitchDelay))<=CurrentRolling Counter<=(ExpectedRollCntrValue+(CounterThreshold+ChannelSwitchDelay)), where (ExpectedRollCntrValue=PreviousRolling Counter+MessageSkipCounter+1). If the condition is met, the rolling counter error is not reported to the operator. The recipient MCU 120 deems that the received data is not valid and does not report a roller counter error, at 770. The recipient MCU 120 sets the DataValid flag to FALSE and the RollCounterError flag to FALSE. If the condition is not met, the recipient MCU 120 deems that the received data is not valid and reports a roller counter error, at 775. The recipient MCU 120 sets the DataValid flag to FALSE and the RollCounterError flag to TRUE.

Alternatively, or in addition, the received data is deemed valid if ResetStatus flag is set to TRUE (block 610, FIG. 6).

Figure 8:
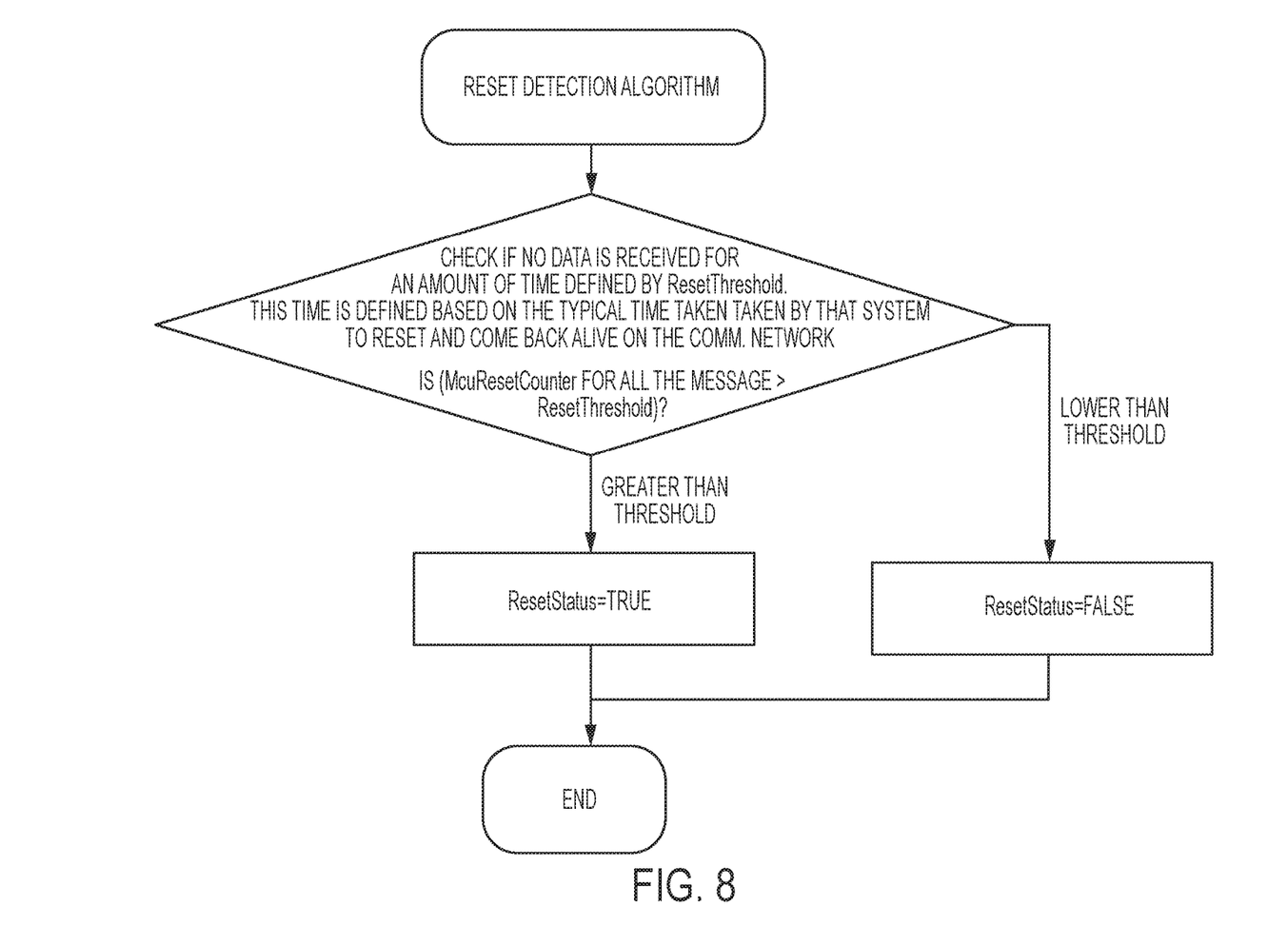
FIG. 8 depicts a flowchart for detecting a reset status of the source MCU according to one or more embodiments.

FIG. 8 depicts a flowchart for detecting a reset status of the source MCU according to one or more embodiments. The recipient MCU 120 considers that the source MCU 110 has been reset if the number of occurrences of "No Data" exceeds a specific predetermined threshold, at 810. The number of occurrences of 'no data' can be determined based on an amount of time data has not been received on either of the communication channels 115 and 125. For example, the recipient MCU 120 monitors the amount of time the source MCU 110 has not sent any data across any of the communication channels 115 and 125 since the recipient MCU 120 has received a previous data. If the duration since the last data exceeds a predetermined ResetThreshold, the recipient MCU 120 determines that the source MCU 110 has been reset, at 820. The ResetStatus flag of the recipient MCU 120 is set to TRUE as indicative of such a case. Alternatively, if the ResetThreshold is not exceeded, the recipient MCU 120 continues to wait for the data from the source MCU 110 and monitoring the duration since last data, at 830. The ResetStatus flag of the recipient MCU 120 is maintained to indicate FALSE in this case. The ResetThreshold is based on a typical time for the communication system 100 to reset an MCU 110/120 and restart operations.

The recipient MCU 120 maintains the MessageSkipCounter, which is incremented on every missed message. The recipient MCU 120 expects the next (new) rolling counter to have a value bigger than the previous rolling counter value by the value of MessageSkipCounter. If consecutive ResyncThreshold amount of rolling counter issues occur, then the recipient MCU 120 identifies that either one of the MCUs 110 and 120 in the communication system 100 have lost synchronization of the rolling counter, and accordingly triggers a resynchronization with the source MCU 110. Rolling counter issue here indicates that the next rolling counter does not exceed the previous rolling counter value by the value of MessageSkipCounter. In one or more examples, if the next rolling counter exceeds the previous rolling counter value by more than (or equal to) the value of MessageSkipCounter, the loss of synchronization case is not triggered.

Further yet, the recipient MCU 120 uses a latency value of CounterThreshold for the rolling counter evaluation within the same communication channel 115 (or 125). Further, for the rolling counter evaluation within different communication channels 115 and 125, the recipient MCU 120 uses an additional latency value of ChannelSwitchDelay.

The communication system 100 may be part of a vehicle, where the MCUs are electronic control units (ECUs) that operate one or more components of the vehicle. The communication between the MCUs in such a case may be across a CAN bus, or other such network bus within the vehicle.

The technical solutions described herein facilitates a communication system between two MCUs with redundant communication channels between the MCUs that communicate the same information to evaluate the communication messages for validity when the MCUs use a rolling counter algorithm. The technical solutions facilitate such a communication system to identify missed messages, stale messages, out of sequence messages, by evaluating a sequence of the rolling counter value to assess the nature of the message.

The technical solutions described herein address technical challenges in case of redundant communication channels between microcontrollers (MCU)s, which communicate the same information and use rolling counter(s). For example, the technical solutions include a method to evaluate a sequence of communication messages between the MCUs in a redundant communication network and react responsively.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A computer-implemented method for evaluating a network communication received over redundant communication channels, the method comprising:
   receiving, during semi-autonomous or autonomous control of the vehicle by a first controller of a steering system of the vehicle, a first communication message transmitted by a second controller;
   receiving, by the first controller, a second communication message transmitted by the second controller of the vehicle;
   in response to a determination that the first communication message and the second communication message are both received via a first communication channel:
      determining whether a present rolling counter value of a rolling counter of the second communication message is within a first predetermined range; and
      in response to determining that the present rolling counter value of the rolling counter of the second communication message is within the first predetermined range, determining that the data of the second communication message is valid;
   in response to a determination that the first communication message is received via the first communication channel and that the second communication message is received via a second communication channel;
      determining whether the present rolling counter value of the rolling counter of the second communication message is within a second predetermined range; and
      in response to determining that the present rolling counter value of the rolling counter of the second communication message is within the second predetermined range, determining that the data of the second communication message is valid;
   and
   in response to a determination that the data of the second communication message is valid, selectively controlling, by the first controller, at least one aspect of the steering system using the data from the second communication message.

2. The computer-implemented method of claim 1, wherein determining if the present rolling counter value is within the first predetermined range is evaluated based an expected roller counter value, a lower limit, a current rolling counter value, and a counter threshold.

3. The computer-implemented method of claim 2, wherein the lower limit is dynamically computed as being equal to the counter threshold if the counter threshold is lesser than a message skip counter, and computed as being equal to the message skip counter if the counter threshold is greater than or equal to the message skip counter, wherein the message skip counter is a counter which indicates a number of missed messages.

4. The computer-implemented method of claim 1, wherein determining if the present rolling counter value is within the second predetermined range is evaluated based an expected roller counter value, a lower limit, a current rolling counter value, and a counter threshold.

5. The computer-implemented method of claim 4, wherein the lower limit is dynamically computed as being equal to the counter threshold plus a channel switch delay if the counter threshold is lesser than a message skip counter, and computed as being equal to the message skip counter if the counter threshold is greater than or equal to the message skip counter, wherein the message skip counter is a counter which indicates a number of missed messages.

6. The computer-implemented method of claim 1, further comprising:
   in response to the data not being valid based on the evaluation, determining whether to generate a rolling counter error based on a previous rolling counter value being within a predetermined range.

7. The computer-implemented method of claim 6, wherein the rolling counter error is generated based on an expected rolling counter value, a counter threshold, a channel switch delay, a previous rolling counter, and a message skip counter.

8. The computer-implemented method of claim 1, wherein the first controller transmits data to the second controller via the first communication channel and the second communication channel in a redundant manner.

9. The computer-implemented method of claim 1, wherein the first controller and the second controller are part of a steering system.

10. A communication system comprising:
    a first controller of a steering system of a vehicle;
    a second controller of the vehicle; and
    one or more redundant communication channels that couple the first controller and the second controller, the first controller configured to transmit data, during semi-autonomous or autonomous control of the vehicle, to the second controller via the one or more communication channels in a redundant manner; and
    the second controller is configured to:
       in response to a determination that the data received from the first controller and a previous data are both received via a first communication channel;
          determine whether a present rolling counter value is within a first predetermined range; and
          in response to determining that the present rolling counter value is within the first predetermined range, determine that the data of received from the first controller is valid;
       in response to a determination that the data received from the first controller is received via the first communication channel and that previous data is received via a second communication channel:
          determine whether the present rolling counter value is within a second predetermined range; and
          in response to determining that the present rolling counter value is within the second predetermined range, determine that the data of the second communication message is valid;
    and
    the second controller selectively controls, at least one aspect of the steering system using the data received from the first controller in response to a determination that the data received from the first controller is valid.

11. The communication system of claim 10, wherein determining if the present rolling counter value is within the first predetermined range is evaluated based an expected roller counter value, a lower limit, a current rolling counter value, and a counter threshold.

12. The communication system of claim 11, wherein the lower limit is dynamically computed as being equal to the counter threshold if the counter threshold is lesser than a message skip counter, and computed as being equal to the message skip counter if the counter threshold is greater than or equal to the message skip counter, wherein the message skip counter is a counter which indicates a number of missed messages.

13. The communication system of claim 10, wherein determining if the present rolling counter value is within the second predetermined range is evaluated based an expected roller counter value, a lower limit, a current rolling counter value, and a counter threshold.

14. The communication system of claim 13, wherein the lower limit is dynamically computed as being equal to the counter threshold plus a channel switch delay if the counter threshold is lesser than a message skip counter, and computed as being equal to the message skip counter if the counter threshold is greater than or equal to the message skip counter, wherein the message skip counter is a counter which indicates a number of missed messages.

15. The communication system of claim 10, wherein the second controller is further configured to:
  in response to the data not being valid based on the evaluation, determine whether to generate a rolling counter error based on a previous rolling counter value being within a predetermined range.

16. A computer program product comprising non-transitory computer readable medium with computer executable instructions stored therein, the computer executable instructions when executed by a first controller of a steering system cause the first controller to communicate with a second controller, the communicating comprising:
  receiving, during semi-autonomous or autonomous control of the steering system, a first communication message transmitted by the second controller;
  receiving a second communication message transmitted by the second controller;
  in response to a determination that the first communication message and the second communication message are both received via a first communication channel:
    determining whether a present rolling counter value of a rolling counter of the second communication message is within a first predetermined range; and
    in response to determining that the present rolling counter value of the rolling counter of the second communication message is within the first predetermined range, determining that the data of the second communication message is valid;
  in response to a determination that the first communication message is received via the first communication channel and that the second communication message is received via a second communication channel;
    determining whether the present rolling counter value of the rolling counter of the second communication message is within a second predetermined range; and
    in response to determining that the present rolling counter value of the rolling counter of the second communication message is within the second predetermined range, determining that the data of the second communication message is valid;
  and
  in response to a determination that the data of the second communication message is valid, selectively controlling, by the first controller, at least one aspect of the steering system using the data from the second controller.

17. The computer program product of claim 16, wherein determining if the present rolling counter value is within the first predetermined range is evaluated based an expected roller counter value, a lower limit, a current rolling counter value, and a counter threshold.

18. The computer program product of claim 17, wherein the lower limit is dynamically computed as being equal to the counter threshold if the counter threshold is lesser than a message skip counter, and computed as being equal to the message skip counter if the counter threshold is greater than or equal to the message skip counter, wherein the message skip counter is a counter which indicates a number of missed messages.

19. The computer program product of claim 16, wherein determining if the present rolling counter value is within the second predetermined range is evaluated based an expected roller counter value, a lower limit, a current rolling counter value, and a counter threshold.

20. The computer program product of claim 19, wherein the lower limit is dynamically computed as being equal to the counter threshold plus a channel switch delay if the counter threshold is lesser than a message skip counter, and computed as being equal to the message skip counter if the counter threshold is greater than or equal to the message skip counter, wherein the message skip counter is a counter which indicates a number of missed messages.

* * * * *